United States Patent
Morita et al.

(10) Patent No.: US 7,840,560 B2
(45) Date of Patent: Nov. 23, 2010

(54) MACRO DELIVERY SYSTEM AND MACRO DELIVERY PROGRAM

(75) Inventors: Yasuaki Morita, Kawasaki (JP);
Nobuyuki Yamazaki, Kawasaki (JP);
Kazumasa Matano, Kawasaki (JP);
Takanori Suzuki, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 694 days.

(21) Appl. No.: 11/094,657

(22) Filed: Mar. 31, 2005

(65) Prior Publication Data

US 2006/0095400 A1 May 4, 2006

(30) Foreign Application Priority Data

Nov. 1, 2004 (JP) .............................. 2004-317813

(51) Int. Cl.
*G06F 17/30* (2006.01)
(52) U.S. Cl. ...................................... 707/736; 707/793
(58) Field of Classification Search ................ 707/793, 707/796
See application file for complete search history.

(56) References Cited

U.S. PATENT DOCUMENTS

| | | | | |
|---|---|---|---|---|
| 6,049,742 A | * | 4/2000 | Milne et al. ................... 700/99 |
| 6,157,947 A | * | 12/2000 | Watanabe et al. ........... 709/217 |
| 6,526,562 B1 | * | 2/2003 | Haddad et al. ................. 716/18 |
| 6,961,918 B2 | * | 11/2005 | Garner et al. .................. 716/18 |
| 7,136,831 B2 | * | 11/2006 | Mori et al. ...................... 705/28 |
| 2002/0095348 A1 | * | 7/2002 | Hiroshige et al. ............. 705/26 |
| 2002/0133411 A1 | * | 9/2002 | Nakamoto et al. ............ 705/22 |
| 2003/0023560 A1 | * | 1/2003 | Soma ............................. 705/51 |
| 2006/0015414 A1 | * | 1/2006 | Congram et al. .............. 705/28 |

FOREIGN PATENT DOCUMENTS

| | | |
|---|---|---|
| JP | 03-250326 | 11/1991 |
| JP | 04-130750 | 5/1992 |
| JP | 2003-44520 | 2/2003 |
| JP | 2004-46361 | 2/2004 |

OTHER PUBLICATIONS

Japanese Office Action dated May 25, 2010 in corresponding application JP2004-317813.

* cited by examiner

*Primary Examiner*—Charles Rones
*Assistant Examiner*—Yuk Ting Choi
(74) *Attorney, Agent, or Firm*—Staas & Halsey LLP

(57) ABSTRACT

In a delivery information setting processing, for each macro, deliverability of the macro and a kind of macro data for constituting the macro are set for each process technology. In a registration processing, the macro data is registered in correlation with a macro name and a process technology name. In a delivery control processing, permission to deliver the macro is given based on the combinational condition of a macro name, a process technology name, a kind of the macro data, a macro revision, and a macro demander. In a first delivery processing, the macro data of the macro permitted for delivery through the delivery control processing is delivered to the macro demander.

15 Claims, 14 Drawing Sheets

| user authority | available service |
|---|---|
| system administrator | user information setting, basic information setting |
| macro deliverer | delivery information setting, macro registration, macro revision setting, delivery achievement display, delivery-date reply/delivery control |
| macro demander | deliverability information display, macro request, macro acquisition (for macro demander) |
| person in charge of subsequent processing | macro acquisition (for person in charge of subsequent processing) |

Fig. 6

DELIVERY IMFORMATION SETTING macro code: I2C

| technology code | TECH1 | TECH2 | TECH3 | TECH4 | TECH5 | TECH6 | TECH7 | TECH8 |
|---|---|---|---|---|---|---|---|---|
| deliverability |  | B | A | A | A | A | A | A |
| registration status |  | B | A | A | A | A | A | A |
| macro data 1 | ✓ | ✓ | ✓ | ✓ | ✓ | ✓ | ✓ | ✓ |
| macro data 2 | ✓ | ✓ | ✓ | ✓ |  | ✓ | ✓ | ✓ |
| macro data 3 | ✓ | ✓ | ✓ | ✓ | ✓ |  |  |  |
| macro data 4 | ✓ | ✓ |  |  | ✓ | ✓ | ✓ | ✓ |
| macro data 5 |  |  |  | ✓ | ✓ | ✓ | ✓ | ✓ |
| macro data 6 |  | ✓ | ✓ | ✓ | ✓ | ✓ | ✓ | ✓ |
| macro data 7 | ✓ |  |  |  |  |  |  |  | apply    exit

Fig. 7

MACRO REQUEST

| request number | 20040601_002 |
| --- | --- |
| production code | PRODUCT1 | macro code technology code

[apply] [exit]

[add] [delete]

Fig. 9

MACRO ADDITION

| macro code | I2C | |
|---|---|---|
| technology code | TECH5 | |

| spec | operation voltage | 3.0 (V) |
|---|---|---|
| | operation temperature | -25 (°C) ~ +75 (°C) | apply    exit

| | kind of macro data | desired delivery date | | kind of macro data | desired delivery date |
|---|---|---|---|---|---|
| ☑ | macro data 1 | 2004/06/08 | ☐ | macro data 11 | |
| ☑ | macro data 3 | 2004/06/08 | ☐ | macro data 12 | |
| ☐ | macro data 4 | | ☐ | macro data 13 | |
| ☐ | macro data 6 | | ☐ | macro data 14 | |
| ☐ | macro data 7 | | ☐ | macro data 15 | |

Fig. 10

MACRO REQUEST

| request number | 20040601_002 | | |
|---|---|---|---|
| production code | PRODUCT1 | | |

| | macro code | | technology code |
|---|---|---|---|
| v | I2C | | TECH5 |
| v | DMAC | | TECH5 |
| v | JPEG3X | | TECH5 |
| | RTC | | |
| v | PCI | | TECH5 |

[apply] [exit]

[add] [delete]

| ☑ delivery-date reply | | DELIVERY-DATE REPLY/DELIVERY CONTROL ☐ delivery control | | | | | |
|---|---|---|---|---|---|---|---|
| | | | | | | apply | exit |
| request number | demander | | department | | TEL | | E-mail |
| 20040601_002 | taro fujitsu | | LSI Design Dept. | | 1234 | | ft@xxxxx.co.jp |
| macro code | technology code | | production code | | | | macro revision |
| !l2C | TECH5 | | PRODUCT1 | | | | 0002  ▷ |
| spec | | | | | | | |
| operation voltage | 3.0 (V) | | operation temperature | -25 (°C) ~ +75 (°C) | | | |
| kind of macro data | data style | | request date | desired delivery date | | | delivery date |
| ☑ macro data 1 | non-customize ▷ | | 2004/06/01 | 2004/06/08 | | | 2004/06/08 |
| ☑ macro data 3 | non-customize ▷ | | 2004/06/01 | 2004/06/08 | | | 2004/06/08 |
| ☐ macro data 4 | non-customize ▷ | | — | — | | | |
| ☐ macro data 5 | non-customize ▷ | | — | — | | | |

MACRO ACQUISITION

| production code | demander | department | TEL | E-mail |
|---|---|---|---|---|
| PRODUCT1 | taro fujitsu | LSI Design Dept. | 1234 | ft@xxxxx.co.jp |

| ☑ | macro code | technology code | | | | macro deliverer group | | |
|---|---|---|---|---|---|---|---|---|
| | I2C | TECH5 | | | | Macro 1st Development Group | | |
| | kind of macro data | data style | | request date | | delivery date | delivery deadline | |
| ☑ | macro data 1 | non-customize | | 2004/06/01 | | 2004/06/08 | 2004/06/15 | |
| ☐ | macro data 3 | non-customize | | 2004/06/01 | | 2004/06/08 | 2004/06/15 | |

| ☑ | macro code | technology code | | | | macro deliverer group | | |
|---|---|---|---|---|---|---|---|---|
| | DMAC | TECH5 | | | | Macro 1st Development Group | | |
| | kind of macro data | data style | | request date | | delivery date | delivery deadline | |
| ☑ | macro data 1 | non-customize | | 2000/06/01 | | 2004/06/08 | 2004/06/15 | |

[apply] [exit]

Fig. 14

MACRO DELIVERY SYSTEM AND MACRO DELIVERY PROGRAM

CROSS REFERENCE TO RELATED APPLICATION

This application is based upon and claims the benefit of priority from Japanese Patent Application No. 2004-317813, filed on Nov. 1, 2004, the entire contents of which are incorporated herein by reference.

BACKGROUND OF THE INVENTION

1. Field of the Invention

The present invention relates to a delivery system of a macro (IP: Intellectual Property) that is a functional block reusable for a system LSI or the like.

2. Description of the Related Art

In the design of the system LSI, a reusable macro (IP macro) has been already developed, but, when information indicating that the development is completed is not opened or when the delivery method (acquisition method) of the macro is not established, the development of the same macro is to be done all over again in one's own company or in one's own department. Accordingly, there is a problem in that the manufacturing cost of the product may be increased or the delivery date of the product may be prolonged. For this reason, a system that can enhance the design efficiency of the system LSI and can administrate the macro that is represented by a macro search system or the like has been developed (for example, see Japanese Unexamined Patent Application Publication Nos. 2003-44520 and 2004-46361).

By the way, in order to efficiently deliver the macro to a macro demander (for example, a designer of the system LSI), when the macro demander demands or acquires the macro, it is important that a process technology (an LSI design rule of 0.18 μm, 0.25 μm, or the like (minimum line width)) and a kind of macro data for constituting the macro (netlist, cell library, simulation data, or the like) can be assigned. In the conventional system, when the macro demander demands or acquires the macro, the process technology and the kind of the macro data cannot be assigned. Accordingly, the macro cannot be efficiently delivered to the macro demander, and thus the design efficiency of the system LSI is degraded.

SUMMARY OF THE INVENTION

Accordingly, it is an object of the present invention to provide a macro delivery system that can efficiently deliver a macro to a macro demander and can enhance a design efficiency of a semiconductor integrated circuit.

In an aspect of the present invention, the following processings are executed by a computer that implements a macro delivery system. In a delivery information setting processing, for each macro, deliverability of the macro and a kind of macro data for constituting the macro are set according to a user input of a macro deliverer for each process technology. Here, the macros represent reusable functional blocks of a semiconductor integrated circuit. In a registration processing, the macro data is registered according to a user input of the macro deliverer in correlation with a macro name and a process technology name. In a delivery control processing, according to a user input of the macro deliverer, permission to deliver the macro is given based on the combinational condition of the macro name, the process technology name, the kind of the macro data, a macro revision, and a macro demander. Here, the macro revision represents the combination of revisions of the macro data registered through the registration processing. In a first delivery processing, according to a user input of the macro demander, the macro data of the macro which is permitted to be delivered through the delivery control processing is delivered to the macro demander.

In such a macro delivery system, through the delivery control processing, permission to deliver the macro is given based on the combinational condition of the macro name, the process technology name, the kind of the macro data and the macro revision assigned by the macro deliverer, and the macro demander. Further, through the first delivery processing, the macro data of the macro which is permitted to be delivered through the delivery control processing is delivered to the macro demander. Thus, the macro can be efficiently delivered to the macro demander and the design efficiency of the semiconductor integrated circuit can be enhanced.

According to the aspect of the present invention, in a request processing, according to a user input of the macro demander, a type name of the semiconductor integrated circuit may be set, and simultaneously the macro name, the process technology name, and the kind of the macro data of the macro that the macro demander demands from the macro deliverer may be set. The delivery control processing may include a processing which gives permission to deliver the macro corresponding to the setting content of the request processing. Therefore, through the request processing, the macro demander can assign the process technology and the kind of the macro data to demand a desired macro from the macro deliverer.

According to the aspect of the present invention, the delivery control processing includes a processing for specifying a macro name, a process technology name, a macro revision, and a macro demander, to permit macro delivery to the specified macro demander even without execution of the request processing.

According to the aspect of the present invention, the request processing may include a processing which sets a desired delivery date for each macro data that the macro demander demands from the macro deliverer.

According to the aspect of the present invention, in a delivery-date reply processing, in order to notify the macro demander of the delivery schedule of the macro data requested in the request processing, necessity/non-necessity to change the requested macro data to one for production type and a scheduled delivery date may be set according to a user input of the macro deliverer. When the necessity to change the macro data into one for the production type is set through the delivery-date reply processing, the macro delivery system permits register of the changed macro data for the production type through the registration processing.

According to the aspect of the present invention, the delivery-date reply processing may include a processing for presenting, via a graphical user interface, whether or not a notification corresponding to the setting made in the request processing is issued.

According to the aspect of the present invention, the request processing may include a processing for setting a desired electrical specification of the macro demander in correlation with the macro name and the process technology name. The delivery-date reply processing may include a processing for resetting the electrical specification set through the request processing. The registration processing may include a processing for verifying whether or not the registered macro data satisfies the electrical specification set through the request processing or the delivery-date reply processing, to store the verification result.

According to the aspect of the present invention, in a macro revision setting processing, the macro revision may be set according to a user input of the macro deliverer in correlation with the macro name and the process technology name. The delivery control processing may include a processing for designating any macro revision set through the macro revision setting processing to select the macro data permitted for delivery. For this reason, the delivery timing or the update timing between the macro data that are delivered to the macro demander can be synchronized with each other. As a result, the data mismatch between the macro data which are used by the macro demander can be prevented.

According to the aspect of the present invention, in a second delivery processing, based on a delivery achievement of the macro data through the first delivery processing, the macro data corresponding to the same macro revision as that of the macro data that is delivered to the macro demander through the first delivery processing or the latest macro revision may be delivered according to a user input of a cooperative worker who works in cooperation with the macro demander. For this reason, the cooperative worker can acquires the macro data of the same revision as that of the macro data acquired by the macro demander who cooperatively works with respect to the same macro or the latest revision. As a result, the data mismatch of the macro data between the macro deliverer and the cooperative worker can be prevented.

According to the aspect of the present invention, in a user information setting processing, for each user, user information including authentication information of the user and authority information representing any one of a system administrator, the macro deliverer, the macro demander, and the cooperative worker may be set. The macro delivery system may judge whether or not the user is an authorized user based on the authentication information. For the user judged as the authorized user, when the authority information representing the system administrator is correlated, the macro delivery system may permit a user input of the user information setting processing. For the user judged as the authorized user, when the authority information representing the macro deliverer is correlated, the macro delivery system may permit a user input of the delivery information setting processing, the registration processing, and the delivery control processing. For the user judged as the authorized user, when the authority information representing the macro demander is correlated, the macro delivery system may permit a user input of the first delivery processing. When the authority information representing the cooperative worker is correlated, the macro delivery system may permit a user input of the second delivery processing. In such a macro delivery system, only the authorized user can execute only a user input of the processing corresponding to the user authority already given through the user information setting processing. For this reason, data rewriting or the like by an unauthorized person can be prevented and security of the system can be strengthened.

According to the aspect of the present invention, for each user correlated with the authority information representing a person other than the system administrator, the user information may include group information representing a group to which the user belongs. For users correlated with the same group information and correlated with the authority information representing the macro deliverer, the macro delivery system may permit a user input of the delivery control processing in common. For the users correlated with the same group information and the user authority information representing the macro demander, the macro delivery system may permit a user input of the first delivery processing in common.

For users correlated with the same group information and correlated with the user authority information representing the cooperative worker, the macro delivery system may permit a user input of the second delivery processing in common. Typically, the macro deliverer, the macro demander, and the cooperative worker work in groups of workers taking charge of the same business, and thus the macro delivery system permits a user input for the users belonging to the same group in common. As a result, the system can be efficiently applied.

According to the aspect of the present invention, in a delivery achievement presentation processing, the delivery achievements of the macro data through the first and second delivery processings may be presented in response to a user input of the macro deliverer. For example, when the macro data needs to be revised, the macro deliverer refers to the delivery achievements of the first and second delivery processings through the delivery achievement presentation processing to specify the macro demander and the cooperative worker who acquire the macro data to be revised. For this reason, information indicating that the macro data needs to be revised can be surely notified.

According to the aspect of the present invention, in a basic information setting processing, the macro name, the process technology name, and the kind of the macro data which are handled by the macro delivery system may be added or deleted according to a user input of the system administrator.

According to the aspect of the present invention, in a delivery information presentation processing, the setting content of the delivery information setting processing may be presented in response to a user input of the macro demander via a graphical user interface. For this reason, the macro demander can easily recognize deliverability of the desired macro and the kind of the macro data that is scheduled to be delivered. As a result, for example, the delivery of the macro (macro data) that is not scheduled to be delivered can be prevented from being requested by the macro demander.

According to the aspect of the present invention, the delivery information presentation processing may include a processing for presenting specification information on the macro according to a user input of the macro demander.

According to the aspect of the present invention, the delivery information setting processing may include a processing for presenting, for each macro, the registration status of the macro data in each process technology via a graphical user interface. For this reason, for each macro, the macro deliverer can easily obtain the registration status of the macro data for each process technology.

According to the aspect of the present invention, the delivery control processing includes a processing for setting, for each macro data permitted for delivery, a period in which the macro data is deliverable by the first delivery processing. Therefore, it is possible to limit the period in which in the first delivery processing the macro demander acquires the macro data permitted for delivery in the delivery control processing. For this reason, the macro data permitted to be delivered through the delivery control processing can be prevented from being acquired by the macro deliverer after much time has passed from permission to deliver. As a result, the macro data of the old revision can be prevented from being erroneously acquired by the macro deliverer.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 is an explanatory view showing relationship between user authorities and available services;

FIG. 7 is an explanatory view showing an example of a delivery information setting screen;

FIG. 9 is an explanatory view showing an example of a macro request screen;

FIG. 10 is an explanatory view showing an example of a macro addition screen;

FIG. 11 is an explanatory view showing an example of a macro request screen;

FIG. 13 is an explanatory view showing an example of a delivery-date reply/delivery control screen; and FIG. 14 is an explanatory view showing an example of a macro acquisition screen.

DESCRIPTION OF THE PREFERRED EMBODIMENTS

Figure 1:
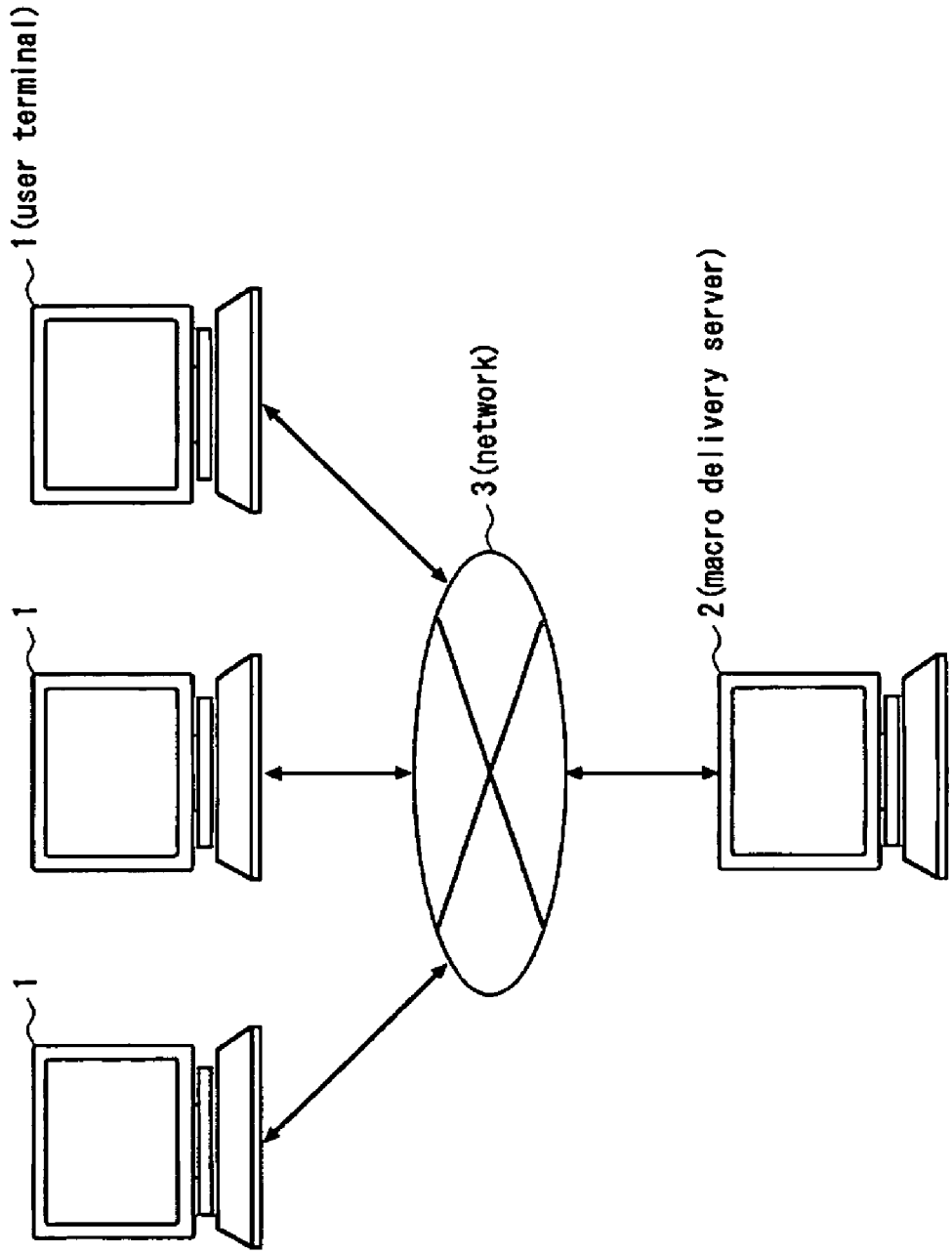
FIG. 1 is an explanatory view showing an example of a configuration of a system that realizes the present invention.

Hereinafter, an embodiment of the present invention will be described with reference to the drawings. FIGS. 1 to 14 show an embodiment of the present invention. FIG. 1 shows an example of a configuration of a system that realizes the present invention. User terminals 1 are connectable to a network 3. A macro delivery server 2 delivers various services for delivering macros (macro data) to the user terminals 1 via the network 3. Each of the user terminals 1 and the macro delivery server 2 has a display device including an LCD or the like and an input device including a keyboard or the like. A user of the system uses a Web browser with the user terminal 1 to access to the macro delivery server 2. The macro delivery server 2 causes information for delivering various services to be displayed on the Web browser screen of the user terminal 1.

Figure 2:
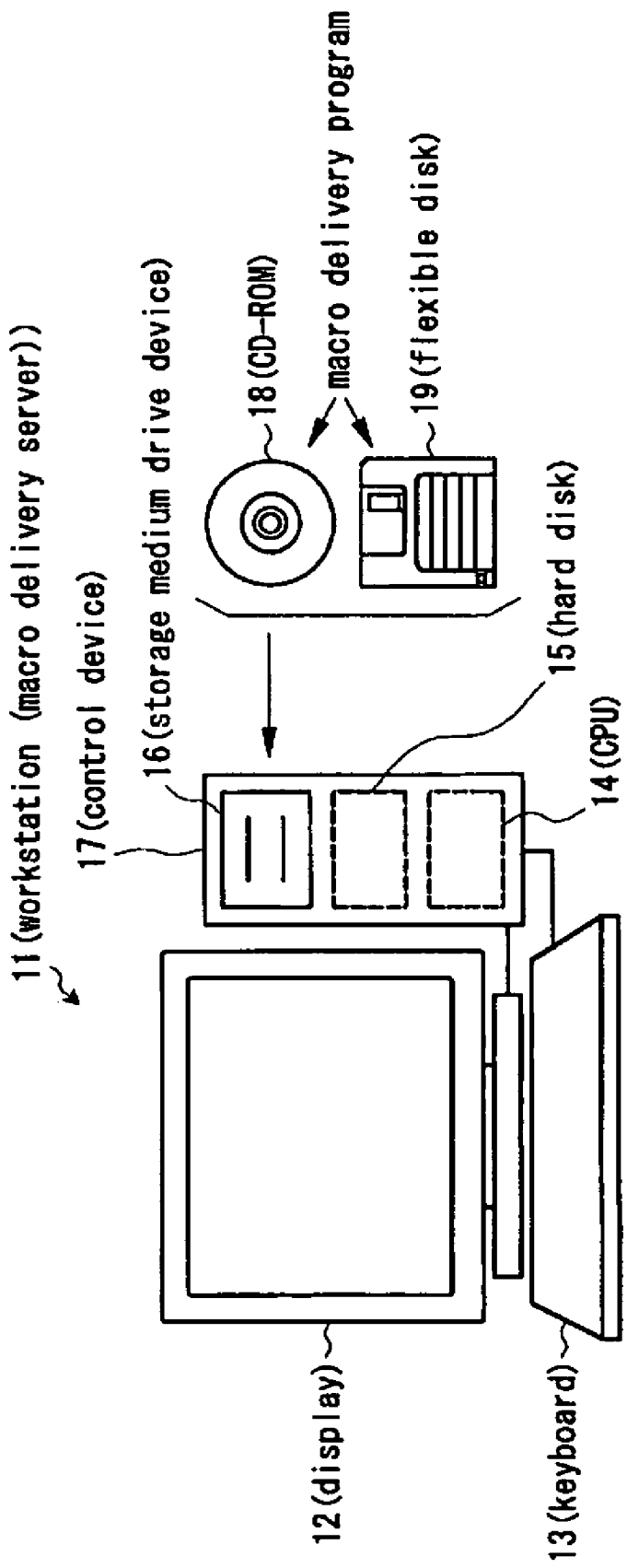
FIG. 2 is an explanatory view showing a macro delivery server.

FIG. 2 shows details of the macro delivery server. For example, the macro delivery server 2 includes a computer such as a workstation 11. Further, the macro delivery server 2 has a display 12 that performs screen display, a keyboard 13 that input a command with the press of a key, a CPU 14, and a control device 17 having a hard disk 15 and a storage medium drive device 16 built-in. A storage medium such as a CD-ROM 18 or a flexible disk 19 is mountable on the storage medium drive device 16. After the CD-ROM 18 or the flexible disk 19 on which a macro delivery program is stored is mounted on the storage medium drive device 16, the workstation 11 downloads the macro delivery program stored in the CD-ROM 18 or the flexible disk 19 to the hard disk 15 in response to the command input via the keyboard 13. The CPU 14 executes the macro delivery program stored in the hard disk 15, and the workstation 11 executes a processing for delivering various services.

Figure 3:
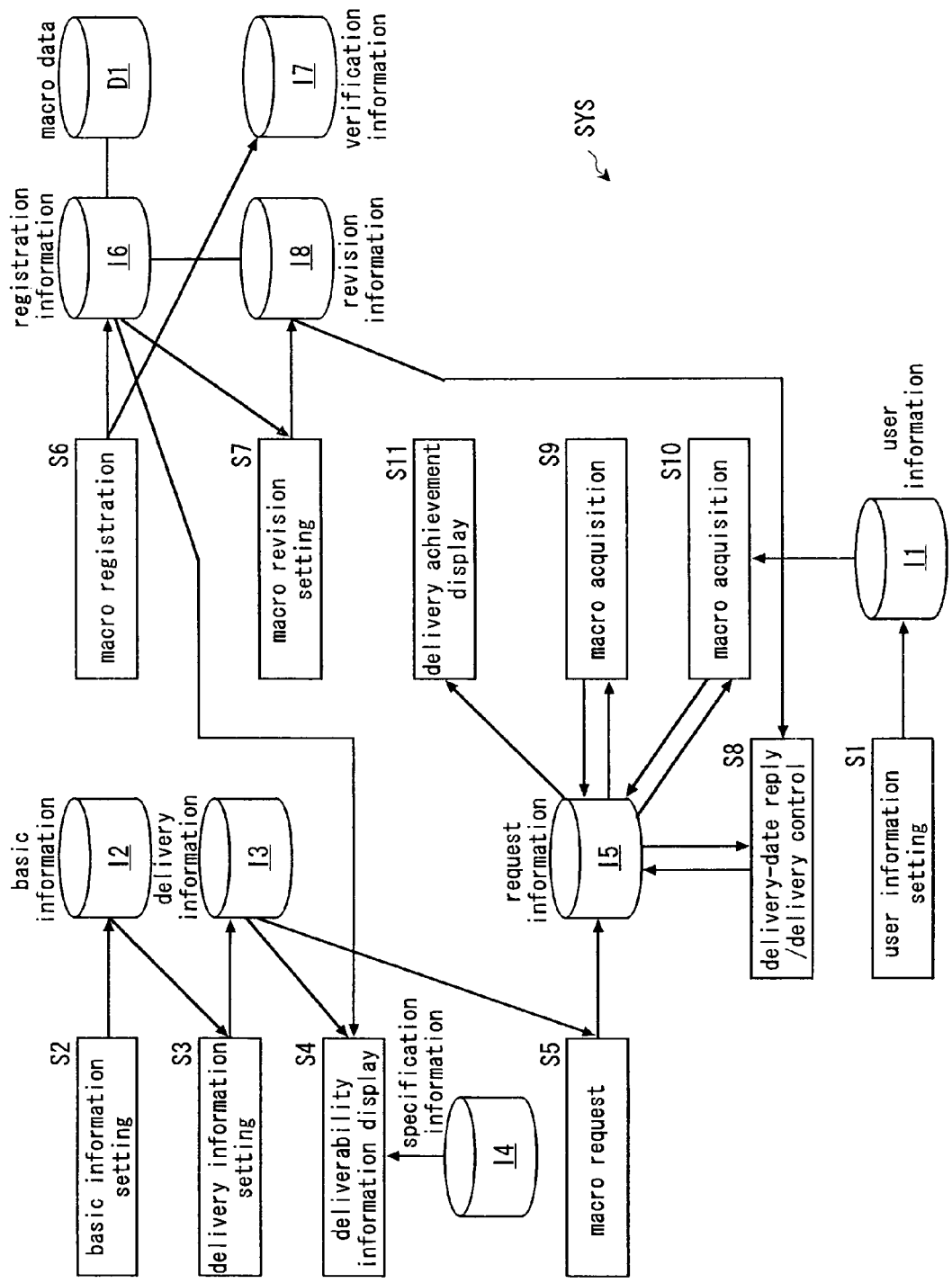
FIG. 3 is an explanatory view showing an outline of a macro delivery system.
Figure 4:
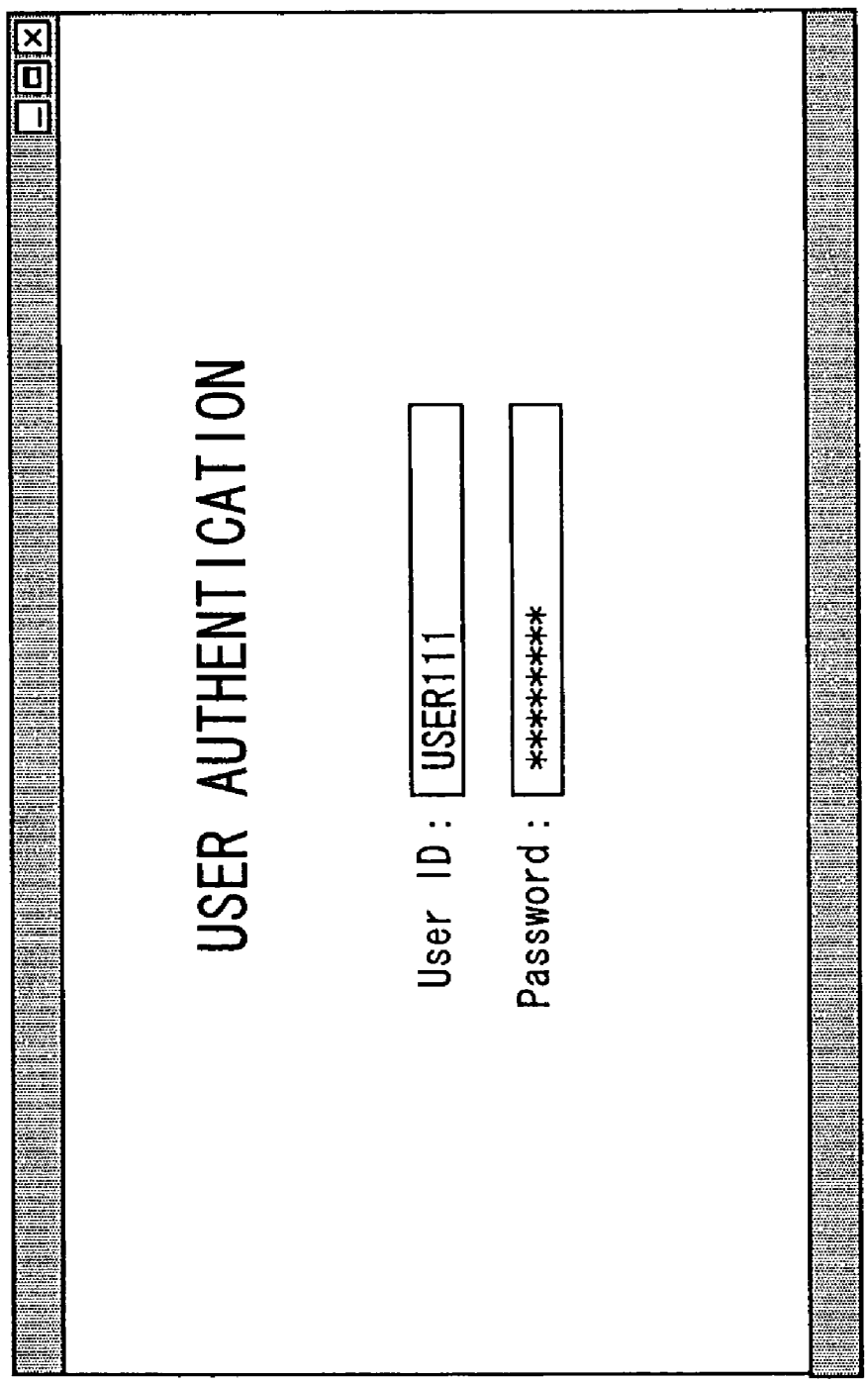
FIG. 4 is an explanatory view showing an example of a user authentication screen.
Figure 5:
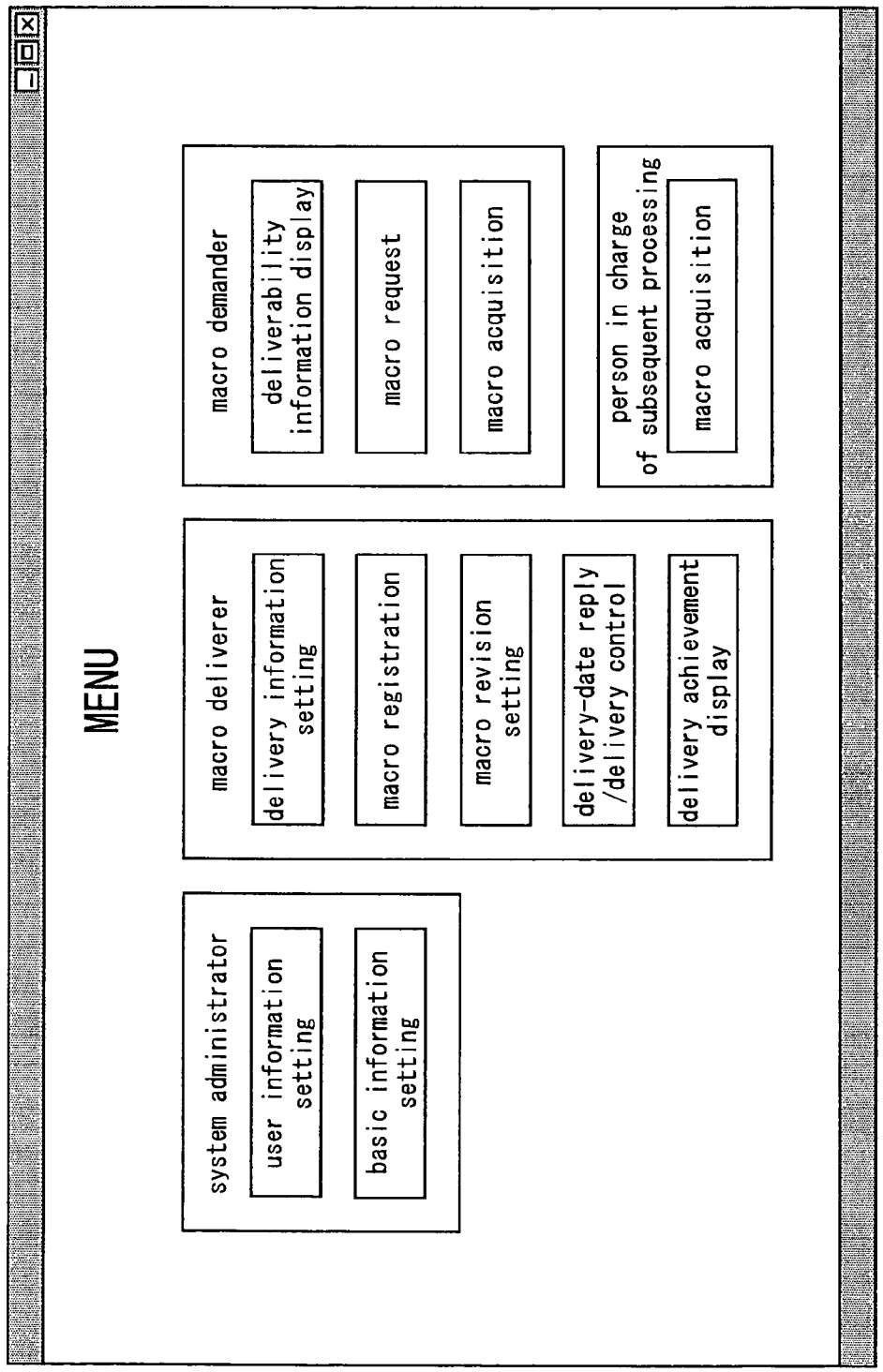
FIG. 5 is an explanatory view showing an example of a menu screen.

FIG. 3 shows an outline of the macro delivery system. FIG. 4 shows an example of a user authentication screen. FIG. 5 shows an example of a menu screen. In a macro delivery system SYS, for example, on the user authentication screen as shown in FIG. 4, if the user inputs a user ID and a password via the input device, user authentication is executed with authentication information previously set by a user information setting service S1 described later. Then, if it is judged that the user who inputs the user ID and the password is an authorized user, the menu screen as shown in FIG. 5 is displayed, for example.

(User Information Setting Service S1)

A system administrator (a user having user authority of the system administrator) clicks a "user information setting" button on the menu screen of FIG. 5 to use the user information setting service S1. Referring to the user information setting service S1 in FIG. 3, according to the user input of the system administrator, a user ID (a character string uniquely assigned to the user), a password (a character string that only the user knows, specifying the user), and user authority (any one of the system administrator, a macro deliverer, a macro demander, and a person in charge of subsequent processing) are set in correlation with the user and the setting content is stored as user information I1. Here, a user having the user authority of the macro deliverer is a person in charge of a macro development or the like. A user having the user authority of the macro demander is a designer or the like who utilizes the macro to design a system LSI. A user having the user authority of the person in charge of the subsequent processing is a worker or the like who takes charge of the subsequent processing in cooperation with the designer of the system LSI.

Further, in the user information setting service S1, according to the user input of the system administrator, in correlation with a user having the user authority of the macro deliverer, the macro demander, or the person in charge of the subsequent processing, other than the system administrator, group information representing a group (a group including users in charge of the same work) to which the user belongs is set and the setting content is stored in the user information I1. In addition, in the user information setting service S1, according to the user input of the system administrator, group correlation information representing correlation between the group information correlated with the user having the user authority of the macro demander and the group information correlated with the user having the user authority of the person in charge of the subsequent processing is set and the setting content is stored in the user information I1. Further, in the user information setting service S1, according to the user input of the system administrator, for each user, address information such as a company name, a one's own department name, a telephone number, or an E-mail address is set, for example, and the setting content is stored in the user information I1.

FIG. 6 shows correlation between user authorities and available services. In the macro delivery system SYS, the system administrator (the user having the user authority of the system administrator) can use the user information setting service S1 and a basic information setting service S2. The macro deliverer (the user having the user authority of the macro deliverer) can use a delivery information setting service S3, a macro registration service S6, a macro revision setting service S7, a delivery-date reply/delivery control service S8, and a delivery achievement display service 11. The macro demander (the user having the user authority of the macro demander) can use a deliverability information display service S4, a macro request service S5, and a macro acquisition service S9 for the macro demander. The person in charge of the subsequent processing (the user having the user authority of the person in charge of the subsequent processing) can use a macro acquisition service S10. Hereinafter, the details of the respective services (except for the user information setting service S1) will be described.

(Basic Information Setting Service S2)

The system administrator clicks a "basic information setting" button on the menu screen of FIG. 5 to use the basic information setting service S2. Referring to FIG. 3, in the basic information setting service S2, according to the user input of the system administrator, macro codes (I2C, DMAC, and so on), technology codes (TECH1, TECH2, and so on respectively corresponding to 0.18 μm, 0.25 μm, and so on), kinds of macro data (netlist, cell library, simulation data, and so on), which are handled by the macro delivery system SYS, are set and the setting content is stored as basic information I2.

(Delivery Information Setting Service S3)

The macro deliverer clicks a "delivery information setting" button on the menu screen of FIG. 5 to use the delivery information setting service S3. Referring to FIG. 3, in the delivery information setting service S3, according to the user input of the macro deliverer, correlation between the technology code and the kind of the macro data, which are scheduled to be delivered for each macro, is set based on the macro code, the technology code, and the kind of the macro data (the basic information I2) set in the basic information setting service S2 and the setting content is stored as delivery information I3.

FIG. 7 shows an example of a delivery information setting screen. If the macro deliverer clicks the "delivery information setting" button on the menu screen of FIG. 5, for example, the delivery information setting screen as shown in FIG. 7 is displayed. Then, if an "apply" button is clicked, the content set on the delivery information setting screen is stored as the delivery information I3. Moreover, if the macro deliverer clicks an "exit" button, the menu screen of FIG. 5 is redisplayed. For example, in the delivery information setting screen of FIG. 7, when a macro I2C that is applicable to a technology TECH5 is scheduled to be delivered, the macro deliverer inputs "A" representing a deliverable macro to a setting column of deliverability corresponding to the technology TECH5 and clicks a check column of the kind (macro data 1 to 7) of the macro data (macro data which can accept the request of the macro demander) that is scheduled to be delivered with respect to the technology TECH 5 (displays "V" in the check column), such that correlation between the technology TECH5 and the kind of the macro data that are scheduled to be delivered with respect to the macro I2C is set. Moreover, for example, though the macro I2C that is applicable to the technology TECH2 is scheduled to be delivered, when the macro is in preparation (development), the macro deliverer inputs "B" representing a macro in preparation to the setting column of deliverability corresponding to the technology TECH2. Further, when the macro I2C that is applicable to the technology TECH1 is not scheduled to be delivered, the macro deliverer maintains the setting column of deliverability corresponding to the technology TECH1 to an blank column representing a non-deliverable macro.

Further, a registration status on the delivery information setting screen of FIG. 7 shows the macro data registration status for each technology of the macro I2C through the macro registration service S6 described later. For example, when all macro data of the kinds which are scheduled to be delivered in the delivery information setting service S3 are registered, "A" is displayed in a display column of the registration status. When some of the macro data are registered, "B" is displayed in the display column of the registration status. When no macro data is registered, "C" is displayed in the display column of the registration status. However, when the setting column of deliverability is the blank column, the display column of the registration status is also an blank column. Accordingly, for each macro, the macro deliverer can easily grasp the registration status of the macro data for each technology.

(Deliverability Information Display Service S4)

Figure 8:
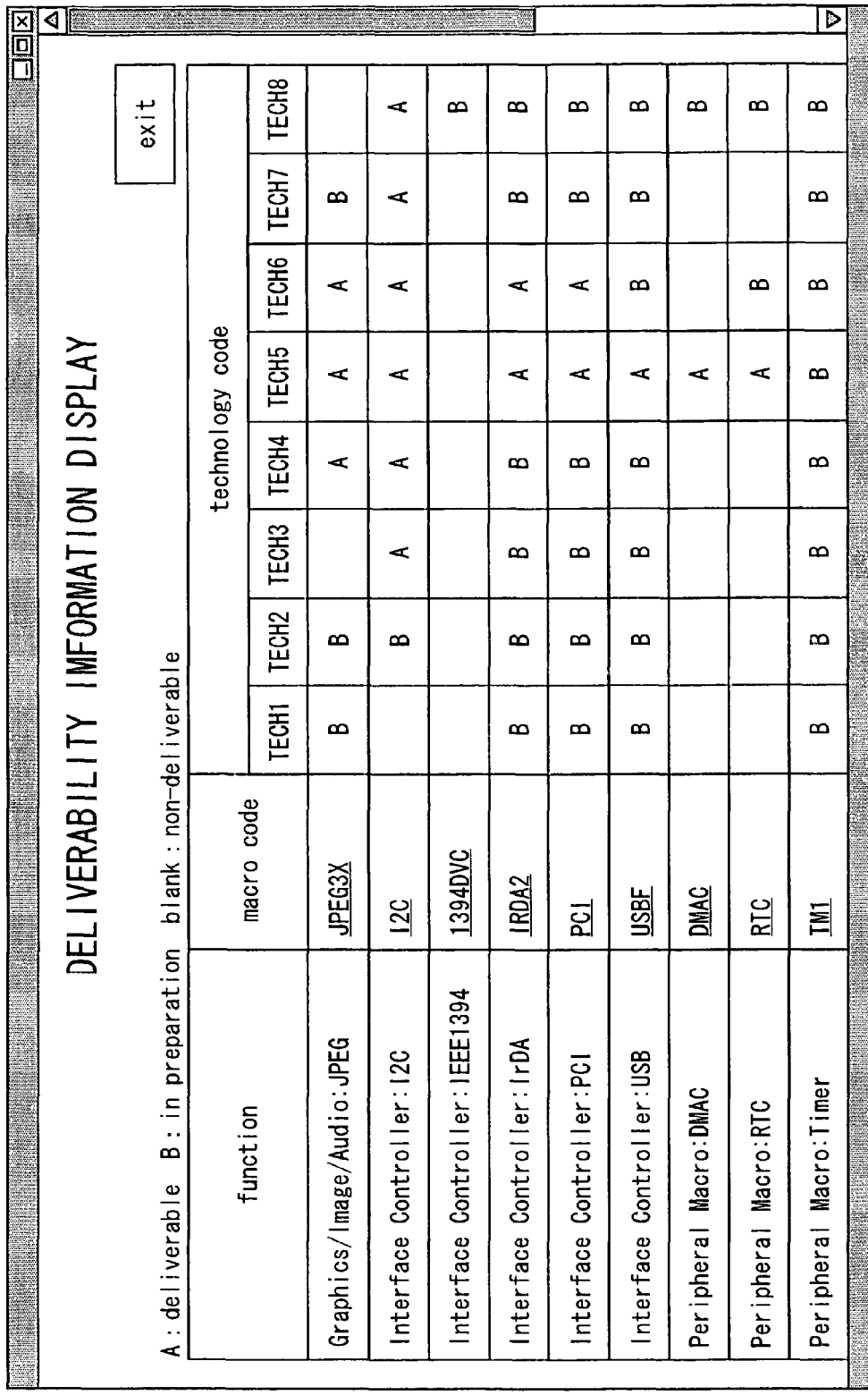
FIG. 8 is an explanatory view showing an example of a deliverability information display screen.

The macro demander clicks a "deliverability information display" button on the menu screen of FIG. 5 to use the deliverability information display service S4. FIG. 8 shows an example of a deliverability information display screen. Referring to FIG. 3, in the deliverability information display service S4, the setting content (delivery information I3) of the delivery information setting service S3 is displayed as the deliverability information display screen as shown in FIG. 8.

The macro demander refers to the deliverability information display screen of FIG. 8 and judges whether or not a desired macro is deliverable. For example, for the macro I2C, the macro demander can easily recognize that the macro of the technology TECH1 is not deliverable, the macro of the technology TECH2 is in preparation, and the macros of the technologies TECH3 to TECH8 are deliverable. Therefore, the macro demander can clearly judge whether or not a desired macro that is applicable to a desired technology is deliverable. Further, when the macro demander clicks the character string of the macro code of the deliverability information display screen, an IP catalog representing detailed information on the macro can be displayed based on specification information I4. For this reason, search efficiency of the macro by the macro demander can be enhanced.

(Macro Request Service S5)

The macro demander clicks a "macro request" button on the menu screen of FIG. 5 to use the macro request service S5. Referring to FIG. 3, in the macro request service S5, according to the user input of the macro demander, the kind of the macro data that the macro demander demands from the macro deliverer is set, together with a production code of a semiconductor integrated circuit, the macro code, and the technology code, and the setting content is stored as request information I5. Further, the setting content in the macro request service S5 is stored as the request information I5. At the same time, the setting content (request content) is notified to all members of a macro deliverer group which take charge of the development of a macro demanded (all macro deliverers set in the same group in the user information setting service S1), for example, by an electronic mail.

FIG. 9 shows an example of a macro request screen. FIG. 10 shows an example of a macro addition screen. FIG. 11 shows an example of a macro request screen. When the macro demander clicks the "macro request" button on the menu screen of FIG. 5, for example, the macro request screen as shown in FIG. 9 is displayed. On the macro request screen of FIG. 9, the macro demander inputs the production code to a setting column of a production code of the semiconductor integrated circuit that uses the macro. Moreover, the macro delivery system SYS automatically gives a unique request number whenever the macro is requested. If the macro demander clicks an "add" button, for example, the macro addition screen as shown in FIG. 10 is displayed. On the macro addition screen of FIG. 10, the macro demander selects desired macro code and technology code via a pull-down menu. Then, the macro demander inputs desired specification values to setting columns of the specification (operation voltage and operation temperature) respectively, clicks a check column of macro data of a desired kind, and sets a desired macro delivery date to a setting column of a desired delivery date of the macro data. Moreover, on the macro addition screen of FIG. 10, the macro data of the kind which is set without being scheduled to be delivered in the delivery information setting service S4 is not displayed.

Subsequently, on the macro addition screen of FIG. 10, if the macro demander clicks an "apply" button, the setting content of the macro addition screen of FIG. 10 is temporarily stored. Then, on the macro addition screen of FIG. 10, if the macro demander clicks an "exit" button, the macro request screen as shown in FIG. 11 is displayed. For the setting content of the macro request screen shown in FIG. 11, the setting content (macro code and technology code) in the macro addition screen of FIG. 10 is reflected in the display content of the macro request screen of FIG. 9. If the macro demander clicks an "apply" button after clicking the check column of a desired macro code, the setting content in the macro request screen of FIG. 11 and the setting content in the macro addition screen of FIG. 10 of the macro that is checked in the macro request screen of FIG. 11 are stored in the request information I5.

(Macro Registration Service S6)

The macro deliverer clicks a "macro registration" button on the menu screen of FIG. 5 to use the macro registration service S6. Referring to FIG. 3, in the macro registration service S6, according to the user input of the macro deliverer, the macro data is registered in correlation with the macro code and the technology code. In the macro registration service S6, for example, registration information I6 representing correlation among the macro code, the technology code, and the kind of the macro data is stored in correlation with the macro data D1. Further, in the macro registration service S6, the registered macro data is analyzed, whether or not the registered macro data satisfies the specification value set in the macro request service S5 or a specification value set in the delivery-date reply/delivery control service S9 described later is verified, and the verification result is stored as verification information I7.

(Macro Revision Setting Service S7)

The macro deliverer clicks a "macro revision setting" button on the menu screen of FIG. 5 to use the macro revision setting service S7. Referring to FIG. 3, in the macro revision setting service S7, according to the user input of the macro deliverer, a macro revision representing the combination of revisions of the macro data is set in correlation with the macro code and the technology code and the setting content is stored as revision information I8 in correlation with the registration information I6. Moreover, a plurality of macro revisions can be set for each combination of the macro code and the technology code.

Figure 12:
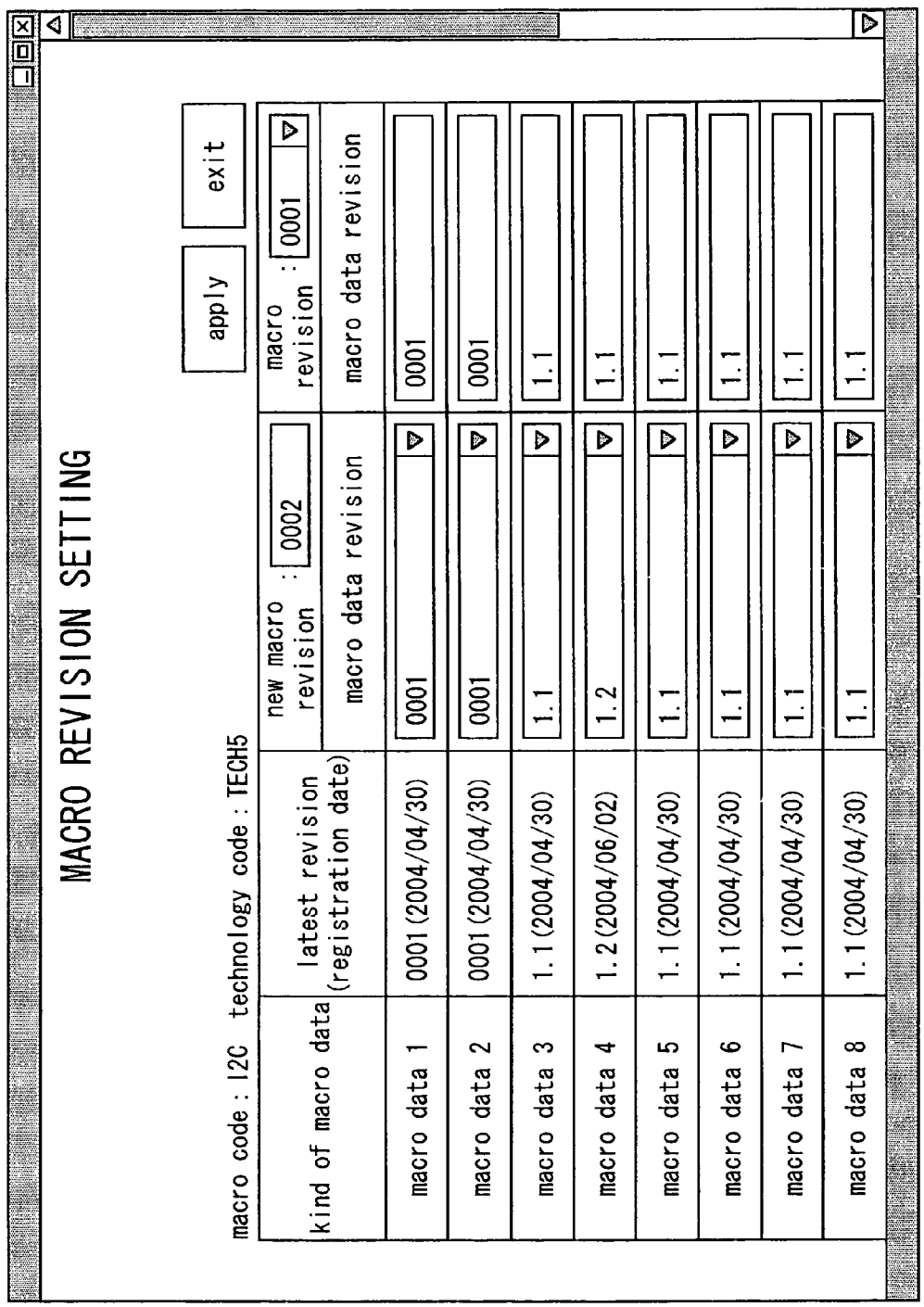
FIG. 12 is an explanatory view showing an example of a macro revision setting screen.

FIG. 12 shows an example of a macro revision setting screen. If the macro deliverer inputs the macro code and the technology code, which are going to set the revision, respectively, after clicking the "macro revision setting" button on the menu screen of FIG. 5, the macro revision setting screen as shown in FIG. 12 is displayed. On the macro revision setting screen of FIG. 12, the macro deliverer inputs a macro revision newly given to a setting column of a new macro revision after selecting the revision of each macro data via a pull down menu. Then, if the macro deliverer clicks an "apply" button, the setting content in the macro revision setting screen of FIG. 12 is stored as revision information I8.

Further, for example, in the macro delivery system SYS, a user macro revision (the above-described macro revision) which is given by the macro deliverer and a system macro revision which is automatically given by the system are provided. For example, as for the user macro revision, even if the macro data is revised due to a mismatch of the macro data corresponding to the macro revision, when the old revision macro data is not delivered to the macro demander, the same macro revision as that of the previous time may be given. On the other hand, if any macro data is revised, the system macro revision automatically and necessarily increments.

(Delivery-Date Reply/Delivery Control Service S8)

The macro deliverer clicks a "delivery-date reply/delivery control" button on the menu screen of FIG. 5 to use the delivery-date reply/delivery control service S8. Referring to FIG. 3, in the delivery-date reply/delivery control service S8, according to the user input of the macro deliverer, necessity to change the macro data demanded in the macro request service S5 into one for production type and a scheduled delivery date are set, and the setting content is stored in the request information I5 (delivery-date reply). Further, in the delivery-date reply/delivery control service S8, according to the user input of the macro deliverer, permission to deliver the macro (macro data) is given corresponding to the setting content in the macro request service S5 (request information I5) and the content is stored in the request information I5 (delivery control). Moreover, in the delivery-date reply/delivery control service S8, even if the macro demander does not demand through the macro request service S5, according to the user input of the macro deliverer, permission to deliver the macro (macro data) is given and the content is stored in the request information I5. In addition, the setting content in the delivery-date reply/delivery control service S8 is stored in the request information I5 and, at the same time, it is notified to all members of the macro deliverer group to which the macro deliver belongs or all members of a macro demander group of the macro demander who demands the macro, for example, by an electronic mail.

FIG. 13 shows an example of a delivery-date reply/delivery control screen. If the request number that is notified by the electronic mail through the macro request service S5 is input after the macro deliverer clicks the "delivery-date reply/delivery control" button on the menu screen of FIG. 5, for example, the delivery-date reply/delivery control screen as shown in FIG. 13 is displayed. On the delivery-date reply/delivery control screen of FIG. 13, when executing the delivery-date reply, the macro deliverer clicks a check column of the delivery-date reply, clicks a check column of the macro data which is scheduled to be delivered, and inputs the scheduled delivery date to a setting column of the delivery date of the macro data. Further, the macro deliverer determines necessity to change the macro data requested into one for the production type. The macro deliverer sets a data style to "customize" when the change is needed and sets the data style to "non-customize" when the change is not needed, via a pull-down menu. Further, the macro deliverer determines validity of the specification value set in the macro delivery service S5. If it is judged that the specification value is not invalid, the macro deliverer may correct the specification value. Then, on the delivery-date reply/delivery control screen of FIG. 13, if the macro deliverer clicks an "apply" button, the setting content is stored in the request information I5 and, at the same time, it is notified to all members of the macro deliverer group and all members of the macro demander group by the electronic mail. Further, if the delivery-date reply of the macro including the macro data whose data style is set to "customize" is executed, the macro data changed into one for the production type can be registered through the macro registration service S5 and permission to deliver the macro data can be given through the delivery-date reply/delivery control service S8.

On the delivery-date reply/delivery control screen of FIG. 13, for example, "!" displayed at a left side of the macro code "I2C" represents that the delivery-date reply with respect to the macro I2C is not executed. For this reason, the macro deliverer can easily grasp the progress status of the work with respect to the request from the macro demander. Further, on delivery-date reply/delivery control screen, when executing the delivery control, the macro deliverer clicks a check column of the delivery control and, at the same time, selects any macro revision set in the macro revision setting service S7 via a pull-down menu to select the macro data which is permitted to be delivered. Then, the macro deliverer clicks a check column of the macro data which is permitted to be delivered and inputs the delivery deadline to a setting column of the delivery deadline of the macro data. Subsequently, on the delivery-date reply/delivery control screen, if the macro deliverer clicks an "apply" button, the setting content is stored in the request information I5 and, at the same time, it is notified to all members of the macro deliverer group and all members of the macro demander group by the electronic mail or the like. Moreover, when the macro demander does not demand through the macro request service S5, for example, if the macro deliverer inputs the macro code, the technology code, and the macro demander group (macro demander) after clicking the "delivery-date reply/delivery control" button on the menu screen of FIG. 5, the delivery-date reply/delivery control screen of FIG. 13 is displayed.

(Macro Acquisition Service S9 (for the Macro Demander))

The macro demander clicks a "macro acquisition" button on the menu screen of FIG. 5 to use the macro acquisition service S9 for the macro demander. Referring to FIG. 3, in the macro acquisition service S9, according to the user input of the macro demander, the macro data of the macro which is permitted to be delivered through the delivery-date reply/delivery control service S8 is delivered to the macro demander based on the request information I5.

FIG. 14 shows an example of a macro acquisition screen. If the macro demander clicks the "macro acquisition" button for the macro demander on the menu screen of FIG. 5, when the delivery date set in the delivery-date reply/delivery control service 58 is not expired, for example, the macro acquisition screen as shown in FIG. 14 is displayed. On the macro acquisition screen of FIG. 14, a chart of only the macro (macro data) which is permitted to be delivered in the delivery-date reply/delivery control service S8 is displayed. On the macro acquisition screen of FIG. 14, if the macro demander clicks an "apply" button after clicking a check column of a desired macro and a check column of macro data of a desired kind, desired macro data is downloaded. At this time, the macro revision, the kind of the macro data, the revision of the macro data, and an acquisitor of the downloaded macro are stored in the request information I5 in correlation with the production code, the macro code, and the technology code.

(Macro Acquisition Service S10 (for the Person in Charge of the Subsequent Processing))

The person in charge of the subsequent processing clicks a "macro acquisition" button for the person in charge of the subsequent processing on the menu screen of FIG. 5 to us the macro acquisition service S10 for the person in charge of the subsequent processing. Referring to FIG. 3, in the macro acquisition service S10, according to the user input of the person in charge of the subsequent processing, the macro deliverer group correlated with a group of persons taking charge of the subsequent processing is specified based on the delivery achievement information (request information I5) of the macro data through the macro acquisition service S9 for the macro demander and the group correlation information (user information I1) set in the user information setting service S1 and a macro having the same macro revision as that of the macro acquired by a member of the macro deliverer group or the latest macro revision is delivered.

If the person in charge of the subsequent processing clicks the "macro acquisition" button for the person in charge of the subsequent processing on the menu screen (FIG. 5), for example, the macro acquisition screen identical to the macro acquisition screen (FIG. 14) in the macro acquisition service S9 for the macro demander is displayed, irregardless of the delivery date set in the delivery-date reply/delivery control service S8. On the macro acquisition screen, if the person in charge of the subsequent processing assigns the same macro revision as that of the macro acquired by the member of the macro deliverer group or the latest macro revision and operates the input in the same sequence as that of the macro acquisition service S9 for the macro demander, desired macro data is downloaded. At this time, similarly to the macro acquisition service S9 for the macro demander, the macro revision, the kind of the macro data, the revision of the macro data, and an acquisitor of the downloaded macro are stored in the request information I5 in correlation with the production code, the macro code, and the technology code.

(Delivery Achievement Display Service S11)

The macro deliverer clicks a "delivery achievement display" button on the menu screen of FIG. 5 to use the delivery achievement display service S11. In the delivery achievement display service S11, delivery achievement information (the production code, the macro code, the technology code, the macro revision, the type of the macro data, the revision of the macro data, and the acquisitor) which is included in the request information I5 is displayed. For this reason, when the macro data needs to be revised, for example, the macro deliverer refers to the delivery achievement information by using the delivery achievement display service S11 to specify the acquisitor of the macro data which needs to be revised. Further, the macro deliverer can surely address the purport that the macro data needs to be revised, for example, by the electronic mail.

As described above, in the present embodiment, the macro demander demands a desired macro from the macro deliverer through the macro request service S5 by assigning the process technology and the kind of the macro data. Further, the macro delivery system SYS gives permission to deliver the macro corresponding to the setting content of the macro request service S5 through the delivery-date reply/delivery control service S8 and delivers the macro data of the macro which is permitted to be delivered in the delivery-date reply/delivery control service S8 to the macro demander through the macro acquisition service S9. As a result, the macro can be efficiently delivered to the macro demander and thus the design efficiency of the system LSI can be enhanced.

The delivery timing or the update timing between the macro data delivered to the macro demander can be synchronized, and thus the data mismatch between the macro data used by the macro demander can be prevented. Further, the person in charge of the subsequent processing can acquire the macro data having the same revision as that of the macro data acquired by the macro demander who cooperatively works with respect to the same macro or the latest revision, and thus the data mismatch of the macro data between the macro deliverer and the person in charge of the subsequent processing can be prevented.

Further, only the authorized user can executes only the user input of the processing corresponding to the user authority which is given in advance through the user information setting service S1, and thus, data rewriting by an unauthorized person can be prevented and security of the macro delivery system SYS can be strengthened. Further, generally, the macro deliverer, the macro demander, and the person in charge of the subsequent processing work in groups of workers taking charge of the same business, and thus the macro delivery system permits the user input for the users belonging to the same group in common. As a result, the system can be efficiently applied.

When the macro data needs to be revised, the macro deliverer refers to the delivery achievements of the macro acquisition services S9 and S10 through the delivery achievement display service S11 to specify the macro demander and the person in charge of the subsequent processing who acquire the macro data to be revised. For this reason, information indicating that the macro data needs to be revised can be surely notified. The macro demander can easily recognize deliverability of the desired macro and the kind of the macro data that is scheduled to be delivered through the deliverability information display service S4. As a result, for example, the delivery of the macro (macro data) that is not scheduled to be delivered can be prevented from being requested by the macro demander.

Further, the period of time in which, through the macro acquisition service S9, the macro demander may acquire the macro data permitted to be delivered through the delivery-date reply/delivery control service S8 can be limited. Thus, the macro data permitted to be delivered through the delivery-date reply/delivery control service S8 can be prevented from being acquired by the macro deliverer after much time has passed from permission to deliver. As a result, the macro data of the old revision can be prevented from being erroneously acquired by the macro deliverer.

Moreover, in the above-described embodiment, an example in which the macro delivery system SYS provides the macro acquisition service for the person in charge of the subsequent processing is described. However, the present invention is not limited to the above-described embodiment. For example, when the service to the person in charge of the subsequent processing is not needed, the macro delivery system SYS may be configured not to provide the macro acquisition service S10 for the person in charge of the subsequent processing.

The invention is not limited to the above embodiments and various modifications may be made without departing from the spirit and scope of the invention. Any improvement may be made in part or all of the components.

What is claimed is:

1. A macro delivery system, comprising:
a delivery information setting unit that sets, for each process technology, deliverability of each macro and a kind of macro data according to a user input of a macro deliverer, the macro being a reusable functional block of a semiconductor integrated circuit, the macro data being for constituting the macro;
a registration unit that registers the macro data in correlation with a macro name and a process technology name, according to the user input of the macro deliverer;
a delivery control unit that permits macro delivery in accordance with combinational condition of the macro name, the process technology name, the kind of macro data, a macro revision and a macro demander, according to the user input of the macro deliverer, the macro revision representing a combination of revisions of the macro data registered through the registration unit;
a first delivery unit that delivers to the macro demander the macro data of the macro permitted in the delivery control unit, according to a user input of the macro demander;
a request unit that sets, according to the user input of the macro demander, a type name of a semiconductor integrated circuit and setting the macro name, the process technology name, and the kind of macro data with regard to a macro for which the macro demander requests to the macro deliverer; and
a delivery-date reply unit that sets, according to the user input of the macro deliverer, a scheduled delivery date, sets necessity when the macro data requested in the request unit is needed to customize to one for production type, and sets non-necessity when the macro data requested in the request unit is not needed to customize to one for production type, in order to notify the macro demander of the delivery schedule and one of necessity and non-necessity of the requested macro data, wherein
the delivery control unit includes a processor that permits macro delivery in accordance with a setting made in the request unit, and
when the delivery-date reply unit sets the necessity, the macro delivery system permits register of the customized macro data for production type in the registration unit to deliver to the macro demander the customized macro data, wherein:
the request unit includes a unit that sets a desired electrical specification of the macro demander in correlation with the macro name and the process technology name;
the delivery-date reply unit includes a unit that resets the electrical specification set in the request unit; and
the registration unit includes a unit that verifies whether or not registered macro data satisfies the electrical specification set through the request unit or the delivery-date reply unit to store a result of verification.

2. The macro delivery system according to claim 1, wherein
the delivery control unit includes a unit that permits macro delivery to a specified macro demander, in accordance with specifying the macro name, the process technology name, the macro revision, and the macro demander by the user input of the macro deliverer.

3. The macro delivery system according to claim 1, wherein
the request unit includes a unit that sets a desired delivery date for each macro data for which the macro demander requests to the macro deliverer.

4. The macro delivery system according to claim 1, wherein
the delivery-date reply unit includes a unit that presents, via a graphical user interface, whether or not a notification corresponding to a setting made in the request unit is issued.

5. The macro delivery system according to claim 1, further comprising:
a macro revision setting unit that sets, according to the user input of the macro deliverer, the macro revision in correlation with the macro name and the process technology name, wherein
the delivery control unit includes a unit that designates any of macro revisions set in the macro revision setting unit to select macro data to be permitted for delivery.

6. The macro delivery system according to claim 5, further comprising:
a second delivery unit that delivers, using a delivery achievement of the macro data in the first delivery unit, macro data to a cooperative worker according to a user input of the cooperative worker who works in cooperation with the macro demander, the macro data having a same macro revision as that of the macro data delivered to the macro demander in the first delivery unit or a latest macro revision.

7. The macro delivery system according to claim 6, further comprising:
a user information setting unit that sets, for each user, user information according to a user input of a system administrator, the user information including authentication information of a user and authority information representing any one of the system administrator, the macro deliverer, the macro demander, and the cooperative worker, wherein
the macro delivery system determines an authenticity of a user based on the authentication information, to permit an authorized user a user input in the user information setting unit when the user is correlated with authority information representing the system administrator, to permit a user input in the delivery information setting unit, the registration unit, the delivery control unit, and the macro revision setting unit when the user is correlated with authority information representing the macro deliverer, to permit a user input in the first delivery unit when the user is correlated with authority information representing the macro demander, and to permit a user input in the second delivery unit when the user is correlated with authority information representing the cooperative worker.

8. The macro delivery system according to claim 7, wherein:
the user information includes group information representing a group to which each user belongs, the each user being correlated with the authority information representing a person other than the system administrator;
the macro delivery system permits users user inputs in the delivery control unit at the same time if the users are correlated with same group information and with authority information representing the macro deliverer;
the macro delivery system permits users user inputs in the first delivery unit at the same time if the users are correlated with same group information and with authority information representing the macro demander;
the macro delivery system permits users user inputs in the second delivery unit at the same time if the users are correlated with same group information and with authority information representing the cooperative worker.

9. The macro delivery system according to claim 6, further comprising:
a delivery achievement presentation unit that presents a delivery achievement of the macro data in the first and second delivery units, in response to a user input of the macro deliverer.

10. The macro delivery system according to claim 1, further comprising:
a basic information setting unit that adds or deletes, according to a user input of the system administrator, the macro name, the process technology name, and the kind of the macro data handled in the macro delivery system.

11. The macro delivery system according to claim 1, further comprising:
a delivery information presentation unit that presents, via a graphical user interface, a setting made in the delivery information setting unit, in response to the user input of the macro demander.

12. The macro delivery system according to claim 11, wherein
the delivery information presentation unit includes a unit that presents specification information on the macro according to the user input of the macro demander.

13. The macro delivery system according to claim 1, wherein
the delivery information setting unit includes a unit that permits for each macro, registration status of the macro data in each process technology via a graphical user interface.

14. The macro delivery system according to claim 1, wherein
the delivery control unit includes a unit that sets, for each macro data permitted for delivery, a period in which the macro data is deliverable by the first delivery unit.

15. A macro delivery program stored on a computer readable storage medium to be executed by a computer, comprising:
a delivery information setting unit that set, for each process technology, deliverability of each macro and a kind of macro data according to a user input of a macro deliverer, the macro being a reusable functional block of a semiconductor integrated circuit, the macro data being for constituting the macro;
a registration unit that registers the macro data in correlation with a macro name and a process technology name, according to the user input of the macro deliverer;
a delivery control unit that permits macro delivery in accordance with combinational condition of the macro name, the process technology name, the kind of macro data, a macro revision and a macro demander, according to the user input of the macro deliverer, the macro revision representing a combination of revisions of the macro data registered through the registration unit;
a first delivery unit that delivers to the macro demander the macro data of the macro permitted in the delivery control unit, according to the user input of the macro demander;
a request unit that sets, according to the user input of the macro demander, a type name of a semiconductor integrated circuit and setting the macro name, the process technology name, and the kind of macro data with regard to a macro for which the macro demander requests to the macro deliverer; and
a delivery-date reply unit that sets, according to the user input of the macro deliverer, a scheduled delivery date, sets necessity when the macro data requested in the request unit is needed to customize to one for production type, and sets non-necessity when the macro data requested in the request unit is not needed to customize to one for production type, in order to notify the macro demander of the delivery schedule and one of necessity and non-necessity of the requested macro data, wherein
the delivery control unit includes a unit that permits macro delivery in accordance with a setting made in the request unit, and
when the delivery-date reply unit sets the necessity, the macro delivery system permits register of the customized macro data for production type in the registration unit to deliver to the macro demander the customized macro data, wherein:
the request unit includes a unit that sets a desired electrical specification of the macro demander in correlation with the macro name and the process technology name;
the delivery-date reply unit includes a unit that resets the electrical specification set in the request unit; and
the registration unit includes a unit that verifies whether or not registered macro data satisfies the electrical specification set through the request unit or the delivery-date reply unit to store a result of verification.

* * * * *